(12) United States Patent
Clougherty et al.

(10) Patent No.: US 6,662,827 B1
(45) Date of Patent: Dec. 16, 2003

(54) OVERPRESSURE RELIEF VALVE FOR PACKAGING CONTAINER

(75) Inventors: Kenan J. Clougherty, Hartsville, SC (US); Teddy M. Westphal, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 10/064,443

(22) Filed: Jul. 15, 2002

(51) Int. Cl.[7] ............................................. F16K 15/14
(52) U.S. Cl. ............. 137/859; 220/203.12; 220/203.29; 383/103; 426/118
(58) Field of Search ................... 137/246, 843, 137/859; 220/203.11, 203.12, 203.16, 203.29; 229/120; 383/103; 426/118

(56) References Cited

U.S. PATENT DOCUMENTS

| | | | |
|---|---|---|---|
| 1,941,048 A | * 12/1933 | Punte | ............... 137/843 |
| 2,429,984 A | * 11/1947 | Berglund | ............... 137/859 |
| 2,946,502 A | * 7/1960 | Metzger | ............... 383/103 |
| 3,799,427 A | 3/1974 | Goglio | |
| 4,134,535 A | 1/1979 | Barthels et al. | |
| 4,210,255 A | * 7/1980 | Pan | ............... 220/203.15 |
| 4,365,715 A | 12/1982 | Egli | |
| 4,444,219 A | 4/1984 | Hollenstein | |
| 4,653,661 A | 3/1987 | Buchner et al. | |
| 4,890,637 A | 1/1990 | Lamparter | |
| 5,263,777 A | 11/1993 | Domke | |
| 5,326,176 A | 7/1994 | Domke | |
| 5,480,030 A | 1/1996 | Sweeney et al. | |
| 5,584,409 A | 12/1996 | Chemberlen | |
| 5,665,408 A | * 9/1997 | Coupe et al. | ............... 383/103 |
| 5,782,266 A | 7/1998 | Domke | |
| 5,931,189 A | 8/1999 | Sweeney et al. | |
| 5,992,442 A | 11/1999 | Urquhart et al. | |
| 6,068,898 A | 5/2000 | Oyama | |
| 6,089,271 A | 7/2000 | Tani | |
| 6,357,468 B1 | * 3/2002 | Roussel | ............... 137/859 |

* cited by examiner

*Primary Examiner*—John Rivell
*Assistant Examiner*—Ramesh Krishnamurthy
(74) *Attorney, Agent, or Firm*—Bullwinkel Partners, Ltd.

(57) ABSTRACT

A membrane type pressure relief valve for packaging containers. The valve comprises a plastic overlay that is formed in a way that causes the center portion of the valve to be pre-stressed when applied to a base sheet or a package wall. The forming of the overlay and its subsequent deformation after application to the base sheet or package wall causes the overlay to act as a mechanical assist to close the valve when the valve oil does not fully force the valve closed.

19 Claims, 2 Drawing Sheets

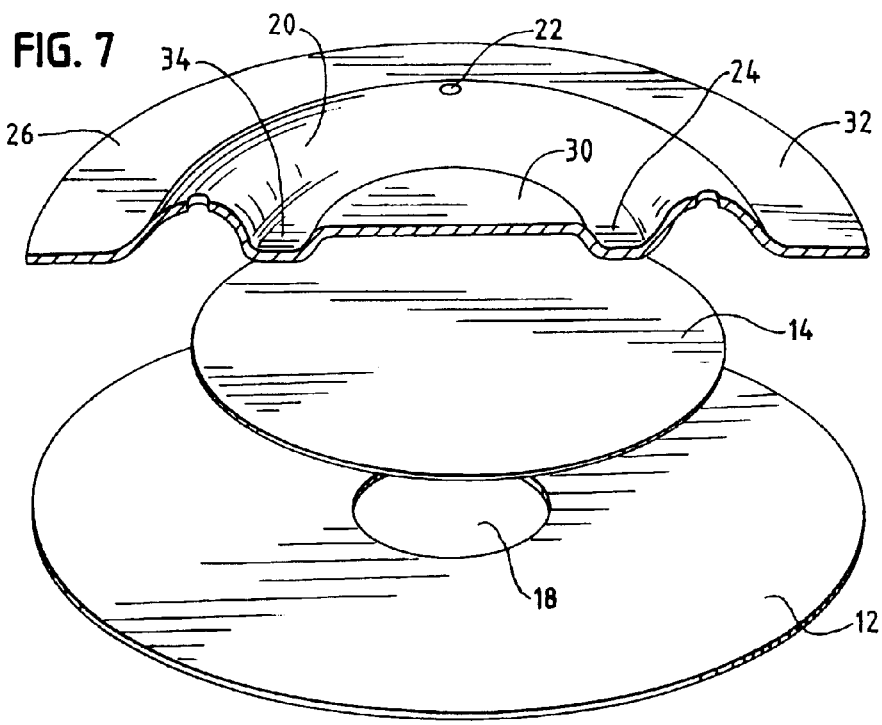
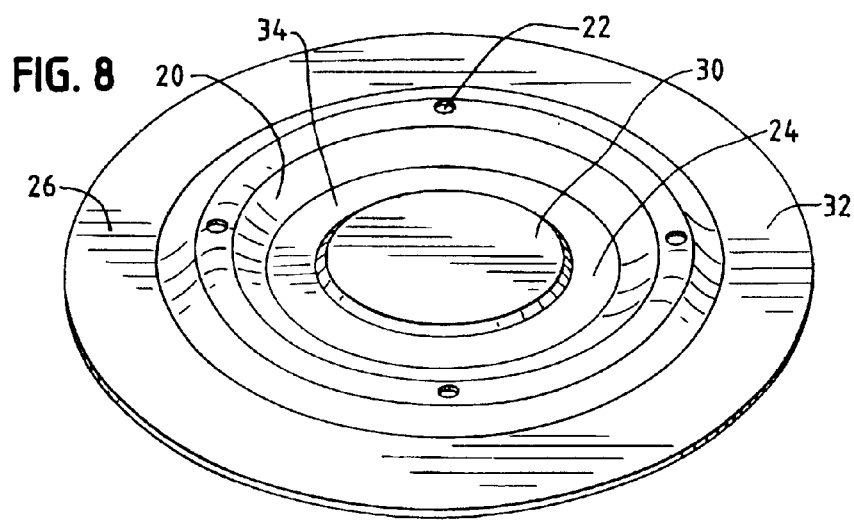
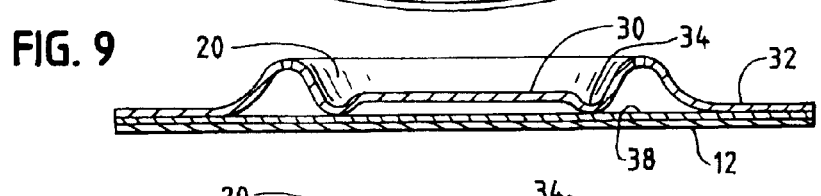
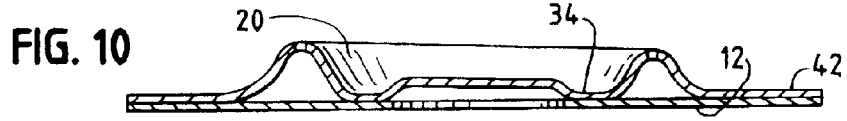

OVERPRESSURE RELIEF VALVE FOR PACKAGING CONTAINER

BACKGROUND OF INVENTION

This patent relates to a pressure relief valve for a packaging container. More particularly, this patent relates a preformed membrane type pressure relief valve for use with roasted coffee packages and the like.

The quality of roasted coffee beans or ground roast coffee will degenerate when exposed to oxygen. Commercial packagers have attempted to minimize the amount of oxygen in the package by using hermetically sealed soft packages or vacuum packed rigid packaging. However, soft packages can become bloated due to the carbon dioxide given off by the roasted beans or ground roast coffee after the roasting process. Rigid packaging will develop an internal pressure that will cause ground coffee to spray or aerosol when the package is opened. This creates a condition that can injure the person opening the package.

Overpressure relief valves may be used to eliminate the internal pressure of the carbon dioxide in all types of coffee packaging. The two most common types of overpressure relief valves used on roast coffee packaging are flexible membrane valves and rigid injection molded plastic type valves.

Membrane type overpressure relief valves generally comprise a flexible membrane or valve element adhered to a substrate by a thin film of pressure sensitive adhesive. In U.S. Pat. No. 4,134,535, the valve element is an oil-impregnated porous material disposed between a container wall and a foil covering. Both the container wall and the covering having openings therein, and pressure is relieved when gas in the container ruptures the oil in the valve element pores.

Buchner et al. U.S. Pat. No. 4,653,661 discloses a membrane valve comprising a plastic foil membrane having parallel adhesive strips. When the internal package pressure exceeds a certain level, the membrane bulges out so gas can escape through a middle path between the strips. A film of oil may be added to help keep the membrane in sealing contact with the package wall.

Domke U.S. Pat. No. 5,236,777 discloses a membrane type valve similar to that in Buchner '661, but with wedge-shaped adhesive strips to prevent ambient air from entering the package through channels formed in the regions of transition between the adhesive-free zone and the peripheral adhesive areas.

Like membrane type valves, rigid injection molded plastic type valves (a.k.a. button valves) generally have a moveable valve element and a base, but the two usually are housed inside an injection molded plastic housing. In one button type pressure relief valve disclosed in U.S. Pat. No. 3,799,427, a rubber disk serving as the valve element rests on a valve seat within a plastic housing. A thin film of silicon oil coats the adjoining surfaces of the valve element and valve seat. The valve element lifts off the valve seat when the force caused by the internal package pressure exceeds the adhesion force of the viscous oil layer between the valve element and the valve seat.

Egli U.S. Pat. No. 4,365,715 discloses a plastic button type relief valve comprising a flexible plastic valve element mounted inside a housing. The valve is biased by mechanical means against the base of the housing.

Hollenstein U.S. Pat. No. 4,444,219 discloses a button type relief valve comprising a housing, a valve member and a "keeper" designed to hold the valve member in place against the bottom of the housing. Oil held in grooves assists in keeping the valve element seated.

Tani U.S. Pat. No. 6,089,271 discloses a button type valve comprising a flexible, concave valve member and a "pressing member" within a housing. The valve member forms a suction fit over an opening in the housing. Pressing member provides a mechanical assist to help the valve member remain sealed.

Membrane type valves tend to be less expensive and less bulky than button type valves. Yet a disadvantage of membrane type valves is that the valve element does not always close after the pressure inside and outside the package nears equilibrium. This is because most membrane type valves rely entirely on oil attraction forces to reseat the valve element onto the valve seat.

Thus it is an object of the present invention to provide a formed plastic film membrane type valve that reliably closes when pressure inside and outside the package nears equilibrium. As described below, this is accomplished by providing a membrane type pressure relief valve having a pre-stressed overlay that acts as a mechanical assist means to close the valve.

Further and additional objects will appear from the description, accompanying drawings, and appended claims.

SUMMARY OF INVENTION

The invention is a formed plastic film membrane type overpressure relief valve for packaging containers, especially those susceptible of internal gas build up such as roasted coffee packages. In one embodiment, the valve has a base sheet that serves as the valve seat, a movable flat valve element, and a plastic formed film overlay. The base sheet has an opening and can be affixed to a package wall by adhesive or other means. The opening in the base sheet is aligned with an opening in the package wall. The overlay has formed therein a raised annular portion that has a plurality of openings arranged around its apex. The valve element raises and lowers in response to the pressure differential between the inside and outside of the package, thereby opening and closing the valve. Oil may be used to increase the adhesion between the valve element and the base sheet of the valve.

The plastic film overlay is manufactured in an unstressed condition. In this unstressed condition, a central portion of the overlay extends below the plane defined by the perimeter portion of the overlay. When the valve is affixed to the base sheet, the center portion is raised into alignment with the plane of the perimeter portion and the raised annular portion deforms slightly. In this deformed, pre-stressed condition, the raised annular portion applies a downward force on the moveable membrane, biasing the valve element in the closed position.

The valve is affixed to the package such that the membrane seals off the opening in the package. The moveable valve element is held in place by the pre-stressed overlay and by the optional oil layer between the valve element and the base sheet. When the pressure inside of the container increases to a predetermined level, the valve element lifts off the base sheet, allowing gas inside the container to escape through the opening in the base sheet and out through the openings in the raised annular portion. When the inside and outside pressures near equilibrium, the valve element is reseated on the base by the oil attraction force with a mechanical assist from the annular portion.

In a second embodiment, the plastic formed film overlay has a raised center portion inside the raised annular portion.

The raised center portion increases the mechanical assist properties of the film overlay, thereby providing a further mechanical assist in biasing the valve element in the closed position. In a third embodiment, the film overlay has an asymmetrical profile that prevents inadvertent valve closure when the valve contacts another package or object.

The valve may be used with or without a base sheet. If no base sheet is used, the valve is affixed directly to the package wall.

BRIEF DESCRIPTION OF DRAWINGS

FIG. 7 is an exploded cutaway view of the overpressure relief valve of FIG. 4.

FIG. 8 is a perspective view of the overpressure relief valve of FIG. 4.

FIG. 9 is a cross-sectional view of the overpressure relief valve of FIG. 4 shown without a valve element and with an optional extrusion coating.

FIG. 10 is a cross-sectional view of a third embodiment of the overpressure relief valve of the present invention.

DETAILED DESCRIPTION

Figure 1:
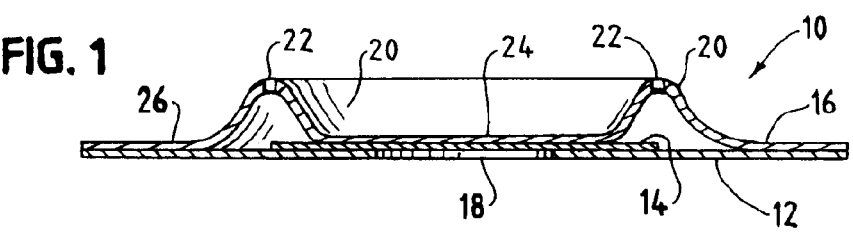
FIG. 1 is a cross-sectional view of a first embodiment of the overpressure relief valve of the present invention.

Turning to the drawings, there is shown in FIG. 1 a cross-sectional view of a first embodiment of the present invention, a membrane type overpressure relief valve for a packaging container. The valve 10 comprises an optional base sheet 12 that serves as the valve seat, a movable flat valve element 14 and a plastic formed film overlay 16. The base sheet 12 has an opening 18 that is covered by the valve element 14. Oil (not shown) may be used to increase the adhesion between the valve element 14 and the base sheet 12.

In a chief aspect of the invention, the overlay 16 is manufactured in a way that causes it to be deformed when applied to the base sheet 12 or directly to a package wall. The configuration of the overlay 16 and its subsequent deformation after application to the base sheet 12 or package wall causes the overlay 16 to act as a mechanical assist to help close the valve when external or atmospheric pressure do not fully force the valve closed.

The overlay 16 is manufactured with a raised annular portion 20 that biases the moveable valve element 14 in the closed position against the base sheet 12. The raised annular portion 20 contains a plurality of openings 22 arranged around its apex and defines a center portion 24 disposed inside the raised annular portion 20. A perimeter portion 26 extends beyond the raised annular portion 20 away from the center portion 24 and is affixed to the base sheet 12.

When in use, the valve 10 is affixed over an opening in the container wall such that the opening 18 in the base sheet 12 communicates with the opening in the container wall. The valve element 14 seals off the opening 18. The valve element 14 is held in place by the mechanical properties of the raised annular portion 20 and by the optional oil layer between the valve element 14 and the base sheet 12.

The valve works in the following manner. When the pressure inside of the container increases to a predetermined level, the valve element 14 is forced off the base sheet 12, allowing gas inside the container to escape through the opening 18 in the base sheet 12 and out through the openings 22 in the raised annular portion 20. When the inside and outside pressures near equilibrium, the valve element 14 is reseated on the base sheet 12 by the attraction forces of the oil with a mechanical assist from the annular portion 20.

Figure 2:
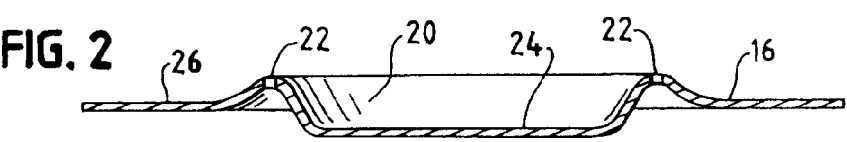
FIG. 2 is a cross-sectional view of the plastic film overlay of FIG. 1 shown in an unstressed position.
Figure 3:
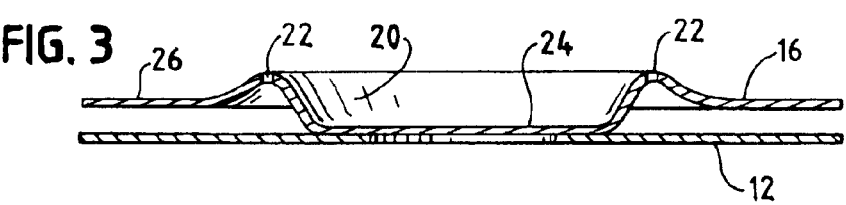
FIG. 3 is a cross-sectional view of the plastic film overlay of FIG. 1 shown in a stressed position.

The function of the raised annular portion 20 may be better understood with reference to FIGS. 1–3. As shown in FIG. 2, the film overlay 16 is manufactured in an unstressed condition. In this unstressed position, the center portion 24 of the overlay 16 extends below the plane defined by the perimeter portion 26. FIG. 3 shows the film overlay 16 in its unstressed condition just prior to being attached to a base sheet 12. When the valve 10 is affixed to the base sheet 12 (FIG. 1) or directly to the package wall, the center portion 24 is raised into alignment with the plane of the perimeter portion 26 and the raised annular portion 20 deforms slightly into the shape shown. In this pre-stressed condition, the raised annular portion 20 applies a downward force onto the center portion 24. This downward force causes the valve element 14 to close off the opening 18 in the base sheet 12.

Alternatively, the valve 10 may be constructed without the optional valve element 14 (FIG. 3), in which case the center portion 24 of the overlay 16 acts as the valve element to close off the opening 18 in the base sheet 12.

The valve may be used without sealing oil by using a base sheet material that is, or has a layer that is, soft enough to allow the overlay 16 to press against the base sheet and form a gasket-like seal. As mentioned above, the valve 10 may be used without a base sheet 12, in which case the film overlay 16 is affixed directly to the package.

The raised portion is preferably circular because a circular shape reduces distortion of the valve from outside forces due to its symmetry. However, other shapes are contemplated, including rectangular. The overlay may be formed from inexpensive polymer film or any other suitable material.

FIGS. 4 to 9 show a second embodiment of the invention, one in which the plastic formed film overlay 16 has a partially raised center panel 30 centrally disposed within the boundary of the raised annular portion 20. The raised center panel 30 increases the mechanical assist properties of the film overlay 16, thereby providing a better seal.

Figure 4:
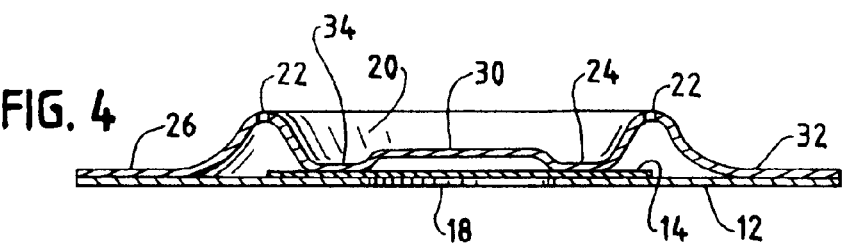
FIG. 4 is a cross-sectional view of a second embodiment of the overpressure relief valve of the present invention.

FIGS. 4, 7 and 8 show one variation of the second embodiment. Like the first embodiment, the valve comprises a base sheet 12, a moveable valve element 14 and a plastic formed film overlay 32. The base sheet 12 has an opening 18 that is covered by the valve element 14. Oil (not shown) may be used to increase the adhesion between the valve element 14 and the base sheet 12.

Also like the first embodiment, the annular portion 20 contains a plurality of openings 22 arranged around its apex. The raised annular portion 20 defines a center portion 24 disposed inside the raised annular portion 20. A perimeter portion 26 extends beyond the raised annular portion 20 away from the center portion 24 and is affixed to the base sheet 12.

Unlike the first embodiment, a portion 30 of the center portion 24 is raised. This raised center panel 30 assists the raised annular portion 20 in providing a mechanical assist to urge the valve element 14 against the base sheet 12, thereby closing the valve. Specifically, the raised portions 20 and 30 urge downward the portion 34 of the center panel 24 that abuts the valve element 14, thereby closing the valve. Oil may be used between the valve element 14 and the base sheet 12 to help keep the valve element 14 in sealing contact with the base sheet 12.

Figure 5:
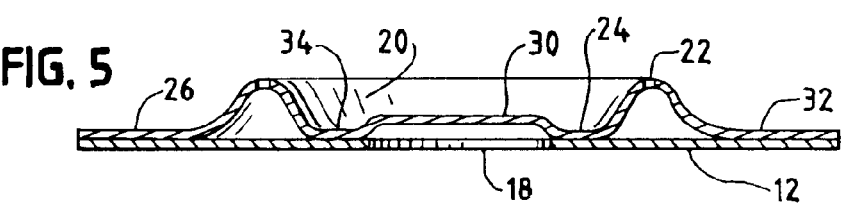
FIG. 5 is a cross-sectional view-of the overpressure relief valve of FIG. 4 shown without a valve element.

FIG. 5 is cross-sectional view of the overpressure relief valve of FIG. 4, shown without the optional valve element 14. In this case, the center portion 24 of the overlay 32 acts as the valve element by raising and lowering in response to the internal package pressure. Preferably, oil is used to help keep the abutting portion 34 in sealing contact with the base sheet 12.

Figure 6:
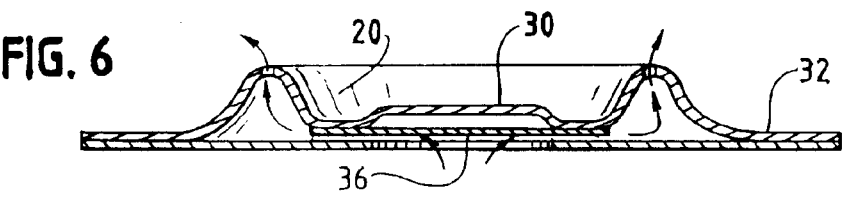
FIG. 6 is a cross-sectional view of the overpressure relief valve of FIG. 4 shown with a different valve element.

FIG. 6 is a cross-sectional view of the overpressure relief valve of FIG. 4 but with a slightly smaller valve element 36. The valve element 36 may be attached to the overlay 32 with or without oil.

FIG. 9 is a cross-sectional view of another variation of the overpressure relief valve of FIG. 4, one with a larger raised center panel 30. The abutting portion 34 of the overlay is curved, instead of flat as in FIG. 4. The base sheet 12 is covered with an optional extrusion coating 38, such as LDPE, to provide a gasket surface.

In a third embodiment shown in FIG. 10, the raised annular portion 20 of the film overlay 42 is asymmetric with respect to a centrally disposed axis normal to the plane of the base sheet 12 to prevent inadvertent valve closure when the valve contacts another object, such as an overcap or package. As in the first two embodiments, the valve comprises a base sheet 12, an optional valve element (not shown in FIG. 10) and a plastic formed film overlay 42. Unlike the first two embodiments, one side of the raised annular portion 42 is higher than the opposite side. This asymmetry allows the valve to contact an object at a point, as opposed to the full circumference of the raised annular portion. This allows the opposite, non-contacting side of the raised annular portion to flex and relieve the internal pressure of the container.

The raised annular portion 42 functions the same way as before. That is, it provides a mechanical assist to bias the valve element or, as in the illustrated variation, the abutting portion 34, against the base sheet 12 to close the valve.

Other modifications and alternative embodiments of the invention are contemplated which do not depart from the spirit and scope of the invention as defined by the foregoing teachings and appended claims. It is intended that the claims cover all such modifications that fall within their scope.

What is claimed is:

1. An overpressure relief valve for a package, the valve comprising:
    a base sheet having an opening and means for affixing the base sheet to the package such that the opening in the base sheet aligns with an opening in the package;
    a valve element adjoining the base sheet and having an open position and a closed position, the valve element covering the opening in the base sheet when in the closed position; and
    an overlay affixed to the base sheet and having holes therein, the overlay having a pre-stressed portion that biases the valve element in the closed position, wherein the pre-stressed portion is a raised annular portion surrounding a center portion of the overlay, the raised annular portion causing the center portion to press down on the valve element, thereby biasing the valve element in the closed position.

2. The overpressure relief valve of claim 1 further comprising oil disposed between the valve element and the base sheet.

3. The overpressure relief valve of claim 1 wherein the overlay further comprises a perimeter portion extending beyond the raised annular portion away from the center panel, the perimeter portion being affixed to the base sheet.

4. The overpressure relief valve of claim 1 wherein the base sheet defines a plane and the raised annular portion is asymmetric with respect to a centrally disposed axis normal to the plane of the base sheet.

5. The overpressure relief valve of claim 3 wherein the overlay is formed in an unstressed condition with the center portion extending below a plane defined by the perimeter portion, and wherein the center portion is brought into substantially coplanar alignment with the perimeter portion when the overlay is affixed to the base sheet thereby deforming the raised annular portion.

6. The overpressure relief valve of claim 3 wherein the perimeter portion defines a plane and the center portion has a concentric center panel raised above the plane of the perimeter portion.

7. An overpressure relief valve for a package, the valve comprising:
    a base sheet having an opening and means for affixing the base sheet to the package such that the opening in the base sheet aligns with an opening in the package; and
    a flexible plastic film overlay, the overlay having a securing portion disposed around the perimeter of the overlay for securing the overlay to the base sheet, a sealing portion for forming a reclosable seal around the entire perimeter of the base sheet opening, and a pre-stressed portion having one or more openings disposed therein through which gas can escape when the seal is broken, the pre-stressed portion biasing the sealing portion in sealing relationship with the base sheet, wherein the pre-stressed portion is a raised annular portion surrounding the sealing portion.

8. The overpressure relief valve of claim 7 wherein the base sheet defines a plane and the raised annular portion is asymmetric with respect to a centrally disposed axis normal to the plane of the base sheet.

9. The overpressure relief valve of claim 7 wherein the overlay is formed in an unstressed condition with the center portion extending below a plane defined by the securing portion, and wherein the sealing portion is brought into substantially coplanar alignment with the securing portion when the overlay is affixed to the base sheet thereby deforming the raised annular portion.

10. The overpressure relief valve of claim 7 wherein the securing portion defines a plane and the sealing portion has a concentric center panel raised above the plane of the securing portion.

11. An overpressure relief valve for a package having a wall with an opening disposed therein, the valve comprising:
    a valve element adjoining the wall and having an open position and a closed position, the valve element covering the opening in the wall when in the closed position; and
    an overlay affixed to the wall and having holes therein, the overlay having a pre-stressed portion that biases the valve element in the closed position, wherein the pre-stressed portion is a raised annular portion that surrounds a center panel, the raised annular portion causing the center panel to press down on the valve element, thereby biasing the valve element in the closed position.

12. The overpressure relief valve of claim 11 wherein the overlay further comprises a perimeter portion extending beyond the raised annular portion away from the center panel, the perimeter portion being affixed to the wall.

13. The overpressure relief valve of claim 11 wherein the wall defines a plane and the raised annular portion is asymmetric with respect to a centrally disposed axis normal to the plane of the wall.

14. The overpressure relief valve of claim 11 wherein the overlay is formed in an unstressed condition with the center portion extending below a plane defined by the perimeter portion, and wherein the center portion is brought into substantially coplanar alignment with the perimeter portion when the overlay is affixed to the wall, thereby deforming the raised annular portion.

15. The overpressure relief valve of claim 12 wherein the perimeter portion defines a plane and the center portion has a concentric center panel raised above the plane of the perimeter portion.

16. An overpressure relief valve for a package having a wall with an opening disposed therein, the valve comprising a flexible plastic film overlay, the overlay having a securing portion disposed around the perimeter of the overlay for securing the overlay to the wall of the package, a sealing portion for forming a reclosable seal around the entire perimeter of the wall opening, and a pre-stressed portion having one or more openings disposed therein through which gas can escape when the seal is broken, the pre-stressed portion biasing the sealing portion in sealing relationship with the wall, wherein the pre-stressed portion is a raised annular portion surrounding the sealing portion.

17. The overpressure relief valve of claim 16 wherein the wall defines a plane and the raised annular portion is asymmetric with respect to a centrally disposed axis normal to the plane of the wall.

18. The overpressure relief valve of claim 16 wherein the overlay is formed in an unstressed condition with the sealing portion extending below a plane defined by the securing portion, and wherein the sealing portion is brought into substantially coplanar alignment with the securing portion when the overlay is affixed to the wall, thereby deforming the raised annular portion.

19. The overpressure relief valve of claim 16 wherein the securing portion defines a plane and the sealing portion has a concentric center panel raised above the plane of the perimeter portion.

* * * * *